United States Patent [19]

Kain

[11] 4,301,109

[45] Nov. 17, 1981

[54] METHOD OF MOLDING A SUSPENSION IDLER

[76] Inventor: Arthur F. Kain, 1726 Virginia Ct., Lakeland, Fla. 33803

[21] Appl. No.: 174,750

[22] Filed: Aug. 4, 1980

[51] Int. Cl.³ .............................................. B29D 3/00
[52] U.S. Cl. .................................... 264/219; 198/824; 264/274; 264/277
[58] Field of Search ............... 264/219, 274, 275, 277; 198/824

[56] References Cited

U.S. PATENT DOCUMENTS

| | | | |
|---|---|---|---|
| 2,876,890 | 3/1959 | Baechli | 198/824 |
| 3,033,352 | 5/1962 | Kain . | |
| 3,182,787 | 5/1965 | Lorenz . | |
| 3,182,788 | 5/1965 | Donadio et al. . | |
| 3,184,828 | 5/1965 | Damet, Jr. | 264/275 |
| 3,454,692 | 7/1969 | Marcut | 264/275 |
| 4,011,938 | 3/1977 | Kain | 198/824 |

Primary Examiner—James B. Lowe
Attorney, Agent, or Firm—William M. Hobby, III

[57] ABSTRACT

A conveyor suspension idler mold apparatus for molding a one-piece, elongated, flexible, polymer idler is disclosed along with a method of molding the conveyor idler and the conveyor idler apparatus. A vertical mold has specially shaped cavities for molding the idler without entrapping air, along with shafts positioning and support brackets at each end of the mold for molding a metal shaft into each end of the polymer idler. The shafts positioning and supporting brackets utilize the groove for the bearing retaining ring for locking each shaft into position.

4 Claims, 7 Drawing Figures

U.S. Patent    Nov. 17, 1981    4,301,109
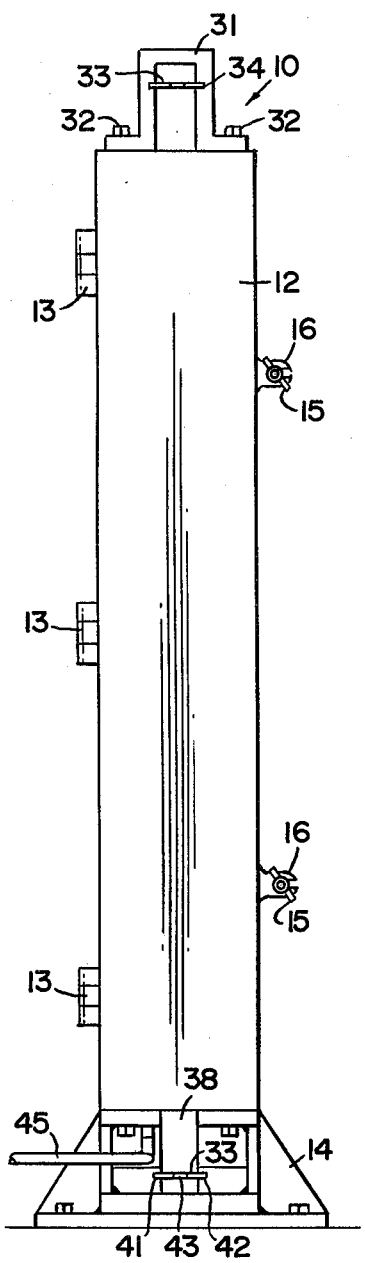
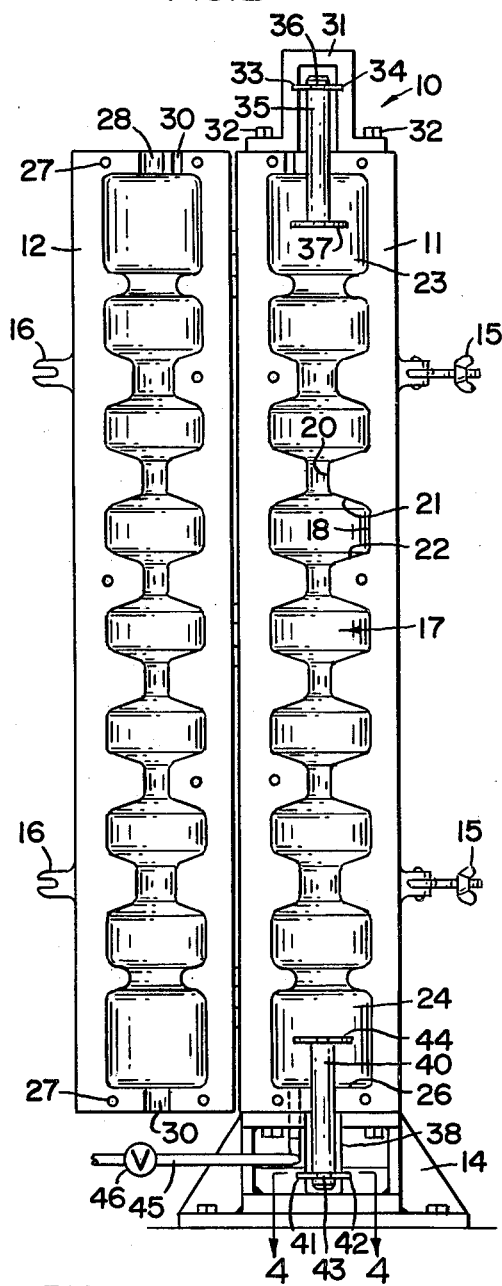
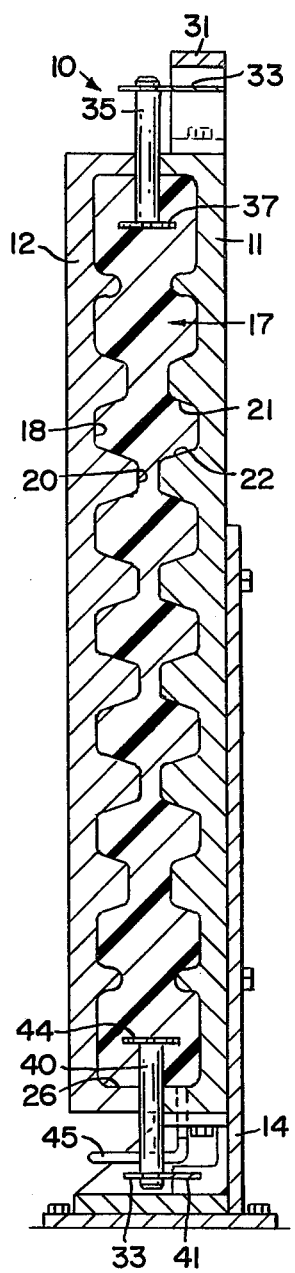
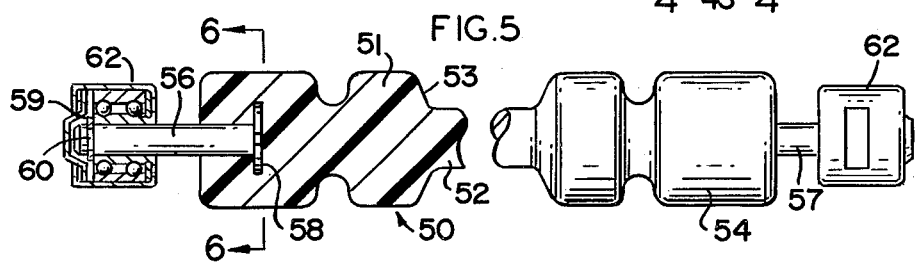
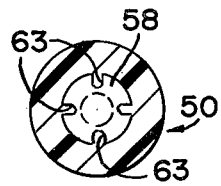
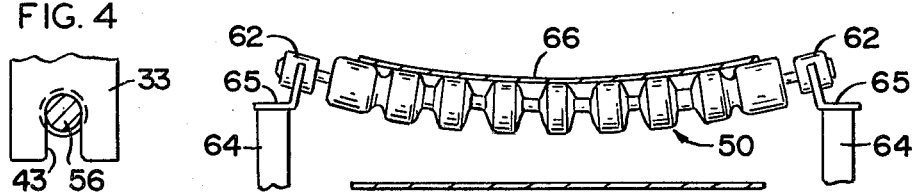

METHOD OF MOLDING A SUSPENSION IDLER

BACKGROUND OF THE INVENTION

The present invention relates to conveyor idlers and especially to an apparatus for molding an elongated, flexible, solid, polymer idler having metal shafts formed in each end, along with the process for molding the idler and the idler apparatus molded by the process.

In the past, it has been common to provide troughing idlers for conveyor belts and these include flexible troughing idlers of the suspension type. Flexible idlers of the suspension type have achieved commercial success as substitutes for previous conventional types of troughing idler having rigid rollers mounted on fixed axes. One such flexible troughing idler of the suspension type includes that illustrated in U.S. Pat. No. 2,876,890, which provides for an idler structure molded on a wire cable in which the wire cable is held to each end by two terminal bearings and in which the molded rollers are molded from neoprene. One disadvantage of this prior art idler is that it requires a great variety of mounts to fit each of many types of conveyor belts which require different vertical and horizontal adjustments of the outer ends of the idlers. The location of the supported ends of the idlers determine the curvature of the trough formed by the conveyor belt. Variations of the type of material to be conveyed frequently calls for various trough depths and curvatures. In installations using previous conventional composite troughing idlers formed of individual rotatable rollers, adjustment of the outer ends of the outer rolls was seldom provided for and any desired degree of troughing was determined by the angularity of the axis of the end intermediate roller. Since the rollers have rigid inflexible axes, adjustment of the ends to vary troughing curvatures is a necessity on a radius determined by the roller length. With the advent of the flexible, suspension type troughing idlers, adjustment of the suspension point became more feasible. In my prior U.S. Pat. No. 3,033,352 for a Conveyor Idler Mounting Means and Support, I provided an adjustable support for the outer extremities of idler support rollers for conveyor belts of a flexible suspension type troughing idlers which provided for a lateral adjustment to be automatically affected as an incident to the vertical adjustment. These prior art flexible troughing idlers and mounts have worked satisfactorily for many years, but the rise in the cost of raw materials has substantially increased the price of the terminal bearings and thereby substantially increased the cost of suspension troughing idlers and their supporting systems. It is accordingly one advantage of the present invention to provide a molded conveyor idler which is easily formed of polymer materials for providing the necessary strength to support conveyor belts for long periods without failure.

In my prior U.S. Pat. No. 4,011,938 for a Suspension Idler, I provide for a conveyor idler and idler terminal bearing which has a one-piece, molded, elongated, flexible, polymer idler having a plurality of rollers formed thereon. Each end of the idler has an enlarged portion which is engaged by terminal supports surrounding the enlarged portion to rotatably hold the idler in its mount. The terminal supports are made entirely of polymer materials, but may have a steel pin mounted thereto for mounting to the conveyor idler mount. The present invention is an improvement over this prior U.S. Patent and provides a terminal connection of increased strength in a polymer idler, without using a cable, or a chain, or the like, molded therein. Through a process that assures the exact same length of each idler and avoids alignment problems and entrapped air during molding in a process for making a conveyor idler.

Other typical, flexible idler rollers having a cable or chain center can be seen in U.S. Pat. No. 3,182,788 to Donadio, et al., and in U.S. Pat. No. 3,182,787 to Lorenz, and other patents of interest may be seen in the U.S. and foreign patents cited as references in my prior U.S. Pat. No. 4,011,938. Molding of prior art suspension idlers is accomplished in a horizontal mold and requires tension on the cable in an attempt to achieve concentricity of the cable and molded idler. However, exact concentricity is not obtained and the idlers have small variations in length. It is accordingly an aim of the present invention to provide an enlongated, flexible, suspension idler made of solid polymer material, such as a high density polyurethane having end shaft members molded thereinto and a molding apparatus and molding process that avoid the prior problems experienced in molding and using solid polymer suspension idlers.

SUMMARY OF THE INVENTION

A vertical mold apparatus for making a suspension idler has a base to support the mold and a vertical mold having a pair of hinged mold portions having a mold cavity formed therein. Upper and lower shaft positioning and support brackets are attached to one mold portion for supporting a shaft having an anchor thereon protruding into said mold cavity during the molding operation, whereby the shaft becomes a portion of each molded suspension idler. The mold cavity has a plurality of connecting shaft cavity portions with the roller cavity portions having an angled surface from the perimeter thereof to the shaft cavity portions to prevent entrapment of air in the vertical molding operation. The upper and lower shaft positioning supports the shaft portion in the groove for the bearing retainer rings. The vertical mold has an overflow opening to release air as liquid polymer is fed from the bottom of the vertical cavity and to indicate when the mold cavity is filled.

A method of making a suspension idler from a molded polymer is also provided in which the vertical mold is made, the shafts are attached to the shaft positioning and support means in the bearing retainer ring groove and the shafts each having an anchor on one end protruding into the mold cavity. The mold cavity is filled from the bottom of the vertically extending mold with a liquid polymer and the polymer cured. The mold is then removed from the molded suspension idler having the shafts protruding from each end.

The suspension idler has an enlongated, flexible, solid, molded polymer idler member having a plurality of intermediate rollers formed thereon connected by spaced flexible shaft portions. The idler member has end rollers on each end having a shaft molded therein with each shaft having an anchor portion molded onto the end roller and a protruding portion having a bearing retainer ring groove. The solid, molded polymer idler has intermittent rollers being shaped with an angled side surface between the roller perimeter and the intermediate shaft portion. A preferred polymer is a high density polyurethane, while a preferred shaft portion formed in the end of each roller is stainless steel.

BRIEF DESCRIPTION OF THE DRAWINGS

Other objects, features and advantages of the present invention will be apparent from the written description and the drawings, in which:

FIG. 1 is a side elevation of a suspension idler mold in accordance with the present invention;

FIG. 2 is a side elevation of the vertical mold of FIG. 1 open to show the mold cavities;

FIG. 3 is a sectional view of the vertical mold of FIGS. 1 and 2 filled with a liquid polymer;

FIG. 4 is a sectional view taken on the line 4—4 of FIG. 2;

FIG. 5 is a partial sectional view of one suspension idler having a support bearing attached to the molded in shaft members;

FIG. 6 is a sectional view taken on the line 6—6 of FIG. 5; and

FIG. 7 is a side elevation of a suspension idler attached to a support and supporting belt thereon.

DESCRIPTION OF THE PREFERRED EMBODIMENTS

Referring to FIGS. 1 through 4 of the drawings, a vertical mold 10 for molding a suspension idler is illustrated having two halves 11 and 12 hinged together by hinge members 13. The mold half 11 is attached to a base support 14 and has mold door latches 15 attached thereto for engaging latching brackets 16 attached to the mold half 12. The mold halves 11 and 12 operate together to form suspension idler cavities 17 for molding a suspension idler. The cavity 17 has a plurality of intermediate roller cavity portions 18 connected to each other by shaft cavity portions 20. Each roller cavity portion 18 has an angled surface 21 and 22 angling from each side of the perimeter of the roller cavity 18 to the intermediate shaft cavity portion 20. The vertical mold 10 has an enlarged end roller cavity 23 at one end and an enlarged roller cavity 24 at the other end, which end portion has a flat outer end surface 25 adjacent the cavity 23 and 26 adjacent the cavity 24. The cavities are provided with mold alignment pins 27. The vertical mold 10 has a shaft opening 28 at the top side and a shaft opening 30 at the bottom side thereof, while the top side also has an overflow and air escape opening 30. An upper shaft positioning and support bracket 31 is attached to the mold half 11 by nuts 32 and has grooves 33 with shaft support member 34 therein, which is attached to an end shaft portion 35 in the bearing retainer ring groove 36 in the shaft 35. The opposite end of the shaft 35 has an anchor 37 formed thereon. Similarly, the opposite side of the mold 10 has a lower shaft positioning and support bracket 38 attached to the mold portion 11 and having a shaft 40 passing through an opening 30 into the mold cavity portion 24 and supported by shaft support member 41 connected to the shaft with fixedly mounted in grooves 42 in the bracket 38 and a bearing retainer ring groove 43 in the shaft 40. The shaft 40 also has an anchor 44 formed on the end thereof and located in the cavity portion 24. The mold cavity 17 has a polymer input line 45 connected into the bottom of the vertical mold 10 to feed the polymer from the bottom of the cavity 17 to the top of the cavity which flow of polymer is controlled by a cutoff valve 46. The bearing retainer ring can also be attached to shafts 35 and 40 and used to support the shaft to shaft support brackets 31 and 38 without departing from the spirit and scope of the invention.

One preferred polymer is a high density polyurethane. The polymer is fed through the inlet pipe 45 until the cavity 17 is filled and the liquid polymer passes out the opening 30, at which time the valve 46 can be manually cut off. Once the polymer has cured, the mold can be opened as shown in FIG. 2, and the extension idler removed. The shafts 35 are released by the opening of the mold so that the shaft 35 can be slid off shaft support member 33 and shaft 40 slid off support member 41. The mold 10 advantageously allows for the filling of a polymer without the entrapment of air by the angled surfaces 21 and 22, and by the filling of the mold from the bottom, thereby forcing air out the opposite end opening 30 as the mold cavity is filled with no place for the trapment of air during the molding. In addition, the shafts 35 and 40 are held in position by the same grooves which also serve to attach the support bearings to the shafts of the completed suspension idler. Supporting the shafts 35 and 40 in this manner in a vertical mold with the anchors 37 and 44 to prevent the loosening of the shafts 35 and 40 assures the suspension idler of always the exact same length. The mold cavities 17 may be coated with a polytrifluorochloroethylene if desired, to assist in the removal of the cured suspension idler. It should also be noted that a nylon string, or the like, can be connected through the mold and this directs the flow of the liquid polymer towards the strings and helps prevent the entrapment of air in a differently designed mold.

The process of making a suspension idler using the molding apparatus 10 involves making a molding apparatus as shown in FIGS. 1 through 4, making shaft ends 35 and 40 as shown, then attaching the shafts 35 and 40 to the brackets 31 and 38 with the shaft support members 33 and 41. The mold cavity 17 is filled from the bottom upward through the line 45 until the liquid polymer overflows through the opening 30 and the molded suspension idler is cured and removed from the mold 10 and attached to a support bearing with the support bearing retainer rings. This vertical molding assures concentricity and the same length for each idler without resulting to tensioned steel cables or chains.

Turning now to FIGS. 5 through 7, a suspension idler in accordance with the present invention is illustrated having an elongated, flexible, polymer suspension idler member 50 having intermittent rollers 51 connected to intermittent shaft portions 52 and having an angled surface 53 between the perimeter of the rollers 51 and the shaft portions 51 and a wider end roller member 54 and 55 on each end. A support shaft 56 is mounted in the end roller 54. Each support shaft has an anchor 58 formed thereon or welded thereto formed in the end portion 55 and protruding therefrom and having an annular groove 60 in the end thereof for accepting the bearing retainer ring 59 for attaching a bearing 62 to each end. The shape of the anchor 58 is more clearly illustrated in FIG. 6 as having a generally flat surface and having a plurality of notched portions 63 therein formed in the polymer body 50. The bearing retainer ring 59 is illustrated attached to the shaft 56 in FIG. 4, and the elongated flexible polymer suspension idler 50 is illustrated in FIG. 7, attached to the idler mounting means 64 by fabricated stirrup-type brackets 65 supporting bearings 62.

A continuous endless troughing belt 66 is shown riding on the suspension idler 50 with the belt returning underneath the suspension idler 50. The suspension idler advantageously is produced without normal reinforcing cable or chain passing therethrough and with polymers, such as a high density polyurethane not normally used for suspension idlers because of the difficulty of molding the material with a center cable or chain. The idler can advantageously withstand the friction and wear on the end shafts by virtue of that portion being steel or a similar metal. However, it should be understood that the present invention is not to be construed as limited to the particular forms shown herein, which are to be considered illustrative rather than restrictive.

I claim:

1. A method of making a suspension idler of a molded polymer material comprising in combination:

making a vertical mold having a plurality of shaft mold portions spaced between a plurality of roller mold portions, said roller mold portions having angled sides angling from said shaft portions to the perimeter of each said roller portion, whereby vertical molding can be accomplished without entrapment of air;

attaching a shaft having an anchor on one end portion to a shaft support bracket at each end of said vertical mold and protruding through an opening in said mold, each said shaft being positioned by closing said mold to lock each shaft in a supported position to said shaft support brackets;

filling said mold with a liquid polymer from the bottom thereof; and curing said polymer and removing said molded suspension idler having end shafts thereon from said mold.

2. The method in accordance with claim 1, including the step of attaching each said shaft in a shaft support bracket to support said shaft on said shaft support bracket with said shaft bearing retainer ring grooves.

3. The method in accordance with claim 2, in which the step of attaching each said shaft in a shaft support bracket includes sliding said shaft annular groove onto a support member sized to fit said shaft groove.

4. The method in accordance with claim 2, in which the step of filling said mold includes filling said mold by the operation of valve until liquid polymer flows from an overflow opening in said mold.

* * * * *